US008386420B2

(12) United States Patent
Nayak et al.

(10) Patent No.: US 8,386,420 B2
(45) Date of Patent: Feb. 26, 2013

(54) FRAMEWORK FOR WEB SERVICES EXPOSING LINE OF BUSINESS APPLICATIONS

(75) Inventors: Tapas Nayak, Hyderabad (IN); Anil Kumar Prasad, Hyderabad (IN); Jayanthi Sampathkumar, Mylapore (IN); Mustansir K. Doctor, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/408,413

(22) Filed: Feb. 29, 2012

(65) Prior Publication Data

US 2012/0159369 A1 Jun. 21, 2012

Related U.S. Application Data

(63) Continuation of application No. 12/332,981, filed on Dec. 11, 2008, now Pat. No. 8,145,593.

(51) Int. Cl.
*G06F 7/00* (2006.01)
*G06F 17/00* (2006.01)

(52) U.S. Cl. ........ 707/607; 707/705; 707/722; 709/217; 709/218; 709/219; 709/227; 709/228

(58) Field of Classification Search .................. 707/607, 707/705, 722, 999.1; 709/217, 218, 219, 709/227, 228, 229
See application file for complete search history.

(56) References Cited

U.S. PATENT DOCUMENTS

| 6,453,354 | B1 | 9/2002 | Jiang |
| 6,810,429 | B1 | 10/2004 | Walsh |
| 6,999,956 | B2 | 2/2006 | Mullins |
| 7,058,717 | B2 | 6/2006 | Chao et al. |
| 7,127,517 | B2 | 10/2006 | Heisig et al. |
| 7,213,227 | B2 | 5/2007 | Kompalli |
| 7,266,827 | B1 | 9/2007 | Sievert |
| 7,447,736 | B2 | 11/2008 | Devine |
| 7,483,875 | B2 | 1/2009 | McKay et al. |
| 7,580,946 | B2 | 8/2009 | Mansour |
| 7,695,370 | B2 | 4/2010 | Liu |
| 7,788,497 | B2 | 8/2010 | Luo |
| 7,788,674 | B1 | 8/2010 | Siegenfeld |
| 7,836,120 | B2 | 11/2010 | Zafar |
| 2002/0023261 | A1 | 2/2002 | Goodwin |
| 2002/0162020 | A1 | 10/2002 | Bellaton |
| 2002/0188610 | A1 | 12/2002 | Spencer |
| 2003/0182426 | A1 | 9/2003 | Hapner |
| 2004/0078495 | A1 | 4/2004 | Mousseau et al. |

(Continued)

OTHER PUBLICATIONS

U.S. Appl. No. 12/332,995, filed May 3, 2012, Office Action.

(Continued)

*Primary Examiner* — Hares Jami
(74) *Attorney, Agent, or Firm* — Workman Nydegger

(57) ABSTRACT

Functionality from a line of business application can be exposed as a web service. User input is received that requests information about objects exposed by a line of business application. Metadata is also gathered about a first set of objects exposed by the line of business application. The metadata is returned to the user. User input is received selecting a second set of objects from among the first set of objects to be exposed as a web service. A web service model is constructed that exposes the second set of objects. The web service model includes a service description, metadata map, and configuration information. The web service model is published to allow for web service clients to access the second set of objects by accessing the web service model. The web service can then be used to translate messages between a line of business application and one or more web service clients.

18 Claims, 5 Drawing Sheets

U.S. PATENT DOCUMENTS

| | | | |
|---|---|---|---|
| 2004/0187140 | A1 | 9/2004 | Aigner |
| 2004/0220878 | A1 | 11/2004 | Lao et al. |
| 2004/0221031 | A1 | 11/2004 | Desai |
| 2005/0027871 | A1 | 2/2005 | Bradley et al. |
| 2005/0038801 | A1 | 2/2005 | Colrain |
| 2005/0044197 | A1 | 2/2005 | Lai |
| 2005/0216555 | A1 | 9/2005 | English et al. |
| 2005/0228803 | A1* | 10/2005 | Farmer et al. ............ 707/100 |
| 2006/0020598 | A1 | 1/2006 | Shoolman |
| 2006/0085438 | A1* | 4/2006 | Burst et al. ............ 707/100 |
| 2006/0101474 | A1 | 5/2006 | Magown |
| 2006/0165040 | A1 | 7/2006 | Rathod et al. |
| 2006/0195476 | A1 | 8/2006 | Nori et al. |
| 2006/0259438 | A1 | 11/2006 | Randle |
| 2006/0265359 | A1 | 11/2006 | Burst et al. |
| 2007/0005613 | A1 | 1/2007 | Singh et al. |
| 2007/0055678 | A1 | 3/2007 | Fung |
| 2007/0067354 | A1 | 3/2007 | Mullender et al. |
| 2007/0073769 | A1* | 3/2007 | Baikov et al. ............ 707/104.1 |
| 2007/0074121 | A1* | 3/2007 | Mullender et al. ............ 715/744 |
| 2007/0106933 | A1* | 5/2007 | Nene et al. ............ 715/513 |
| 2007/0168454 | A1 | 7/2007 | Ben-Yehuda |
| 2007/0219976 | A1 | 9/2007 | Muralidhar et al. |
| 2007/0239858 | A1 | 10/2007 | Banerji |
| 2007/0244987 | A1 | 10/2007 | Pedersen |
| 2007/0255717 | A1 | 11/2007 | Baikov et al. |
| 2008/0071908 | A1 | 3/2008 | Nair et al. |
| 2008/0127211 | A1 | 5/2008 | Belsey et al. |
| 2008/0228742 | A1 | 9/2008 | Zhang |
| 2009/0055202 | A1 | 2/2009 | Venkatesh et al. |
| 2009/0300656 | A1 | 12/2009 | Bosworth |

OTHER PUBLICATIONS

David Chappell, WCF Communications Options in the .NET Framework 3.5, website: http://www.infoq.com/news/2008/01/wcf-comm-options, posted Jan. 16, 2008 (4 pgs).

BizTalk 2006 R3 announced!, Top XML, website: http://www.topxml.com/rbnews/Biztalk-Adapters/re-90730_BizTalk-2006-R3-announced.aspx, May 5, 2008 (2 pgs).

Building and Deploying an Enterprise-Quality Management Solution for Web Services, Technical Case Study, Microsoft IT Showcase, May 2004 (13 pgs).

XGloo Anexis Server, XGLOO, website: http://www.xgloo.co.uk/Products/AnexisServer.aspx, 2007 (1 pg).

Tom Fuller, Windows Communication Foundation: Steroids for your Enterprise Service-Oriented Architecture (Part II), ASP Alliance, website: http://aspalliance.com/articleViewer.aspx?aId=738&pId=-1, Jun. 3, 2008 (8 pgs.).

Developing adapters using WCF: Adapter Connection Management, website: http://blogs.msdn.com/sonuarora/archive/2007/04/20/adapter-connection-management.aspx, Apr. 21, 2007 (7 pgs).

Developing adapters using WCF: About WCG LOB Adapter SDK (ASDK), website: http://blogs.msdn.com/sonuarora/archive/2007/03/26/about-wcf-lob-adapter-sdk.aspx, Mar. 26, 2007 (6 pgs).

David Chappell, Dealing with Diversity: Understanding WCF Communication Options in the .NET Framework 3.5, David Chappell & Associates, Sep. 2007 (23 pgs).

How It Works: JNBridge JMS Adapter for .NET, JNBridge, website: http://www.jnbridge.com/JMS-NET-Adapter-how.htm, retrieved on Jun. 3, 2008 (2 pgs).

Web Services Security: SAML Token Profile; Feb. 2003; Oasis; Working Draft 06.

Liu et al., "Performance Engineering of a Java-based e-commerce System", IEEE, Mar. 2004, pp. 33-37. Download: http://ieeexplore.ieee.org/stamp/stamp.jsp?tp=&arnumber=1287286.

Beltran et al., "A Hybrid Web Server Architecture for Secure e-Business Web Applications", CiteSeer, Oct. 2005. Download: http://citeseerx.ist.psu/viewdoc/summary?doi+10.1.1.135.2850.

U.S. Appl. No. 12/332,981, filed Mar. 21, 2011, Office Action.
U.S. Appl. No. 12/332,995, filed Mar. 29, 2011, Office Action.
U.S. Appl. No. 12/332,995, filed Aug. 9, 2011, Office Action.
U.S. Appl. No. 12/332,981, filed Aug. 31, 2011, Office Action.
U.S. Appl. No. 12/332,981, filed Nov. 8, 2011, Notice of Allowance.

* cited by examiner

FRAMEWORK FOR WEB SERVICES EXPOSING LINE OF BUSINESS APPLICATIONS

CROSS-REFERENCE TO RELATED APPLICATIONS

This application is a continuation of U.S. patent application Ser. No. 12/332,981 filed on Dec. 11, 2008 and entitled "FRAMEWORK FOR WEB SERVICES EXPOSING LINE OF BUSINESS APPLICATIONS," which application is hereby expressly incorporated herein in its entirety.

BACKGROUND OF THE INVENTION

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system.

Integration with line of business application systems becomes challenging due to issues like non-standard metadata, large metadata, differences in connection management, and management of these line of business integration services.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF THE INVENTION

One embodiment described herein includes a computer implemented method of exposing functionality from a line of business application as a web service. The method includes receiving user input requesting information about objects exposed by a line of business application. Metadata is gathered about a first set of one or more objects exposed by the line of business application according to the user input requesting information. The metadata is returned to the user. User input is received selecting a second set of one or more objects from among the first set of one or more objects to be exposed as a web service. A web service model is constructed that exposes the second set of one or more objects. The web service model includes a service description, a metadata map, and configuration information. The web service model is published in a computer implemented repository to allow for web service clients to access the second set of objects by accessing the web service model.

Another embodiment includes a computer implemented method of allowing access to a line of business application through a web service interface. The method includes accessing a web service model at a computer implemented repository. The web service model exposes one or more objects of a line of business application. The web service model includes a service description, a metadata map, and configuration information. The web service model is exposed to one or more web service clients. Communications between the line of business application and one or more web service clients are translated.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION OF THE PREFERRED EMBODIMENTS

Figure 1A:
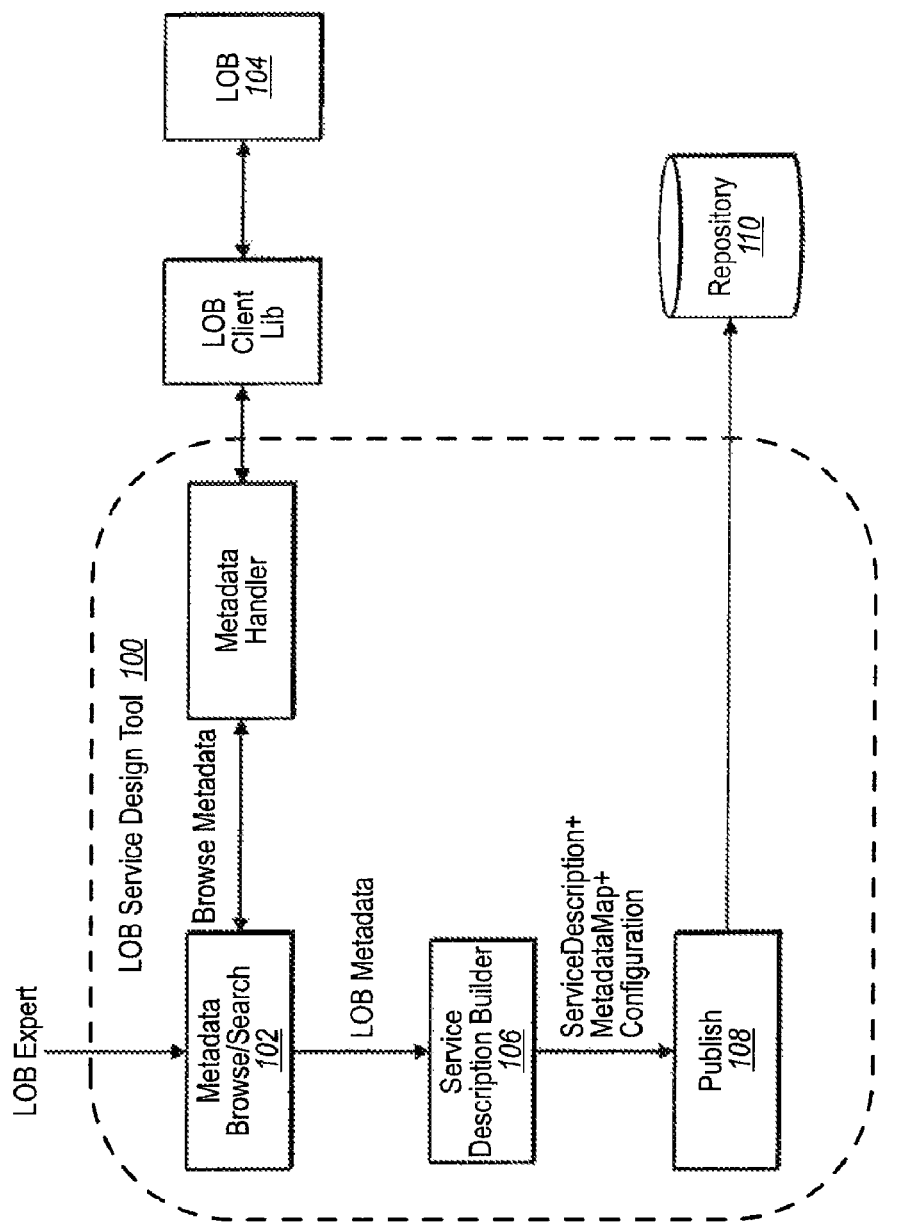
FIG. 1A illustrates a design time piece of a framework for translating messages between web services clients and line of business applications.

Some embodiments include functionality implementing a framework that facilitates line of business applications being accessed by web service clients. The framework provides a design time application programming interface (API) for creation of a web service from a line of business application. The web service can then be stored and later accessed to expose the line of business functionality. The web service can then be used to translate incoming and outgoing line of business messages. In particular, a runtime API can be used to receive messages from web service clients and to translate them to line of business messages that can be sent to the line of business application. Similarly, line of business notifications can be translated to web service notifications and transmitted to a web services client.

Embodiments may include functionality to standardize the way an end-user finds a line of business artifact or object. This includes ability to browse the target system for all artifacts and search for specific artifacts. This browsing and searching may reveal metadata representations of line of business artifacts. These metadata representations of line of business artifacts is a step towards opening up closed line of business to external applications. However, even after standardizing the metadata representation, line of business metadata may still use user unfriendly/cryptic object names in metadata.

Embodiments may be implemented with functionality to represent artifacts/objects residing in a line of business application in standard a web service contract format, such as the Windows Communication Foundation (WCF) contract format available for use with .NET technologies available from Microsoft Corporation of Redmond Wash.

Illustrating further, typically line of business systems have thousands of artifacts/objects. One of the challenges with exposing these systems to external system is to represent line of business artifacts/object in standard manner. Once line of business artifacts get represented in standard format, it becomes much easier to invoke/interact with them.

As noted above, exposing line of business objects to external applications may involve addressing browsability, searchability, and definability. Browsabilty represent the ability to see all objects present in line of business. Thus, some embodiments include functionality for browsing of line of business objects. Searchability includes the ability to locate matching objects based on some search criteria. Thus, some embodiments implement search functionality for line of business objects. Definability includes the ability to define line of business objects in standard format, such as by using Web Services Definition Language (WSDL).

Some embodiments categorize line of business objects either as "Category" or "Operation". This can be analogized to a file system where there are directories and files. A category can contain one or more categories or operations inside it, while an operation is a leaf node and can't contain anything inside it. Some embodiments use a single Type to describe both categories and operations. The reason for taking this approach is that line of business applications generally take a hierarchical approach to category objects present inside.

Referring now to FIG. 1A, an example of the design time API is illustrated. FIG. 1A illustrates various software modules that may be implemented by executing code stored in a computer readable medium on one or more processors to implement the design time API 100. The design time API 100 includes a metadata browse/search module 102, which provides search and/or browse capabilities for searching line of business metadata or navigating through line of business metadata stored at a line of business application 104. The browse functionality allows end users to get a list of line of business objects for the entire line of business application 104 or at a given category. The search functionality allows end users to get a matching list of line of business objects for the entire line of business application or at given category based on user specified search criteria.

Once one finds and selects the line of business objects to be exposed on the desired web service, another API, illustrated in FIG. 1A as the Service Description Builder module 106, can be invoked which obtains the detailed metadata for the chosen objects and creates a service contract for a web service. Resolve functionality of some embodiments allows end users to get the definition of line of business objects in standard format. As, the adapters facilitate the creation of web services from chosen line of business operations, some embodiments represent line of business object as common language runtime (CLR) types. Based on how end users invoke the web services, these objects can end up represented in WSDL on non web service platforms.

When defining a line of business objects several factors are taken into account. For example, embodiments may determine if an object in the line of business application 104 is an object callable (e.g. subroutine/procedure/function) as an operation from outside the line of business application. Further, embodiments determine how an object gets invoked. Additionally multiple line of business operations could be exposed to end-users as a single web service user operation and whenever it gets invoked by the user, all these operations must be invoked in the right order. Additionally, in some situations, before invoking a line of business operation, the line of business may require that proper context is set on the line of business connection. Information addressing each of these factors may be preserved in metadata, such as in a metadata map that is included in an adapter which maps line of business object metadata to web service object metadata.

Other factors that may be taken into account include factors related to input parameters and output parameters for the previously described operations. For example, information may be obtained by examining line of business metadata to determine how these parameters are taken in or given out by a line of business. For example, a line of business may use a fixed buffer for taking in binary data with each parameter of fixed length and mapping to a fixed offset in the buffer. Information about input parameters and output parameters may also be stored as metadata in the metadata map.

Additionally, the web service definition may include information related to parameter types, such as if parameters are primitive types such as int, bool, etc or a collection of primitive types such as struct. Information is further included in the web service definition defining the mapping between business types being used in operation with CLR types, and may include information related to whether or not there is a one-to-one mapping between line of business types being used in operation with CLR types. If there is a one-to-one mapping between line of business type and CLR type, information about whether one of them is more restrictive may be included so that mapping can be handled appropriately. In situations where there is no mapping, the web service definition may define custom types aggregating business types.

The web service may be specified completely declaratively including declaring datacontracts, message contracts and mapping information for mapping web service metadata to line of business metadata. The web service generated includes a contract and mapping information as well as a configuration piece, which can be used to provision the web service as per integration need. The web service and configuration together can either be compiled and saved in some file, can be deployed on some host or can simply be saved in some repository for later provision and deployment. As illustrated in FIG. 1A, a Publish module 108 may be utilized which can publish the web service to a repository 110. From the repository 110 the web service can be later deployed on a host system.

Figure 1B:
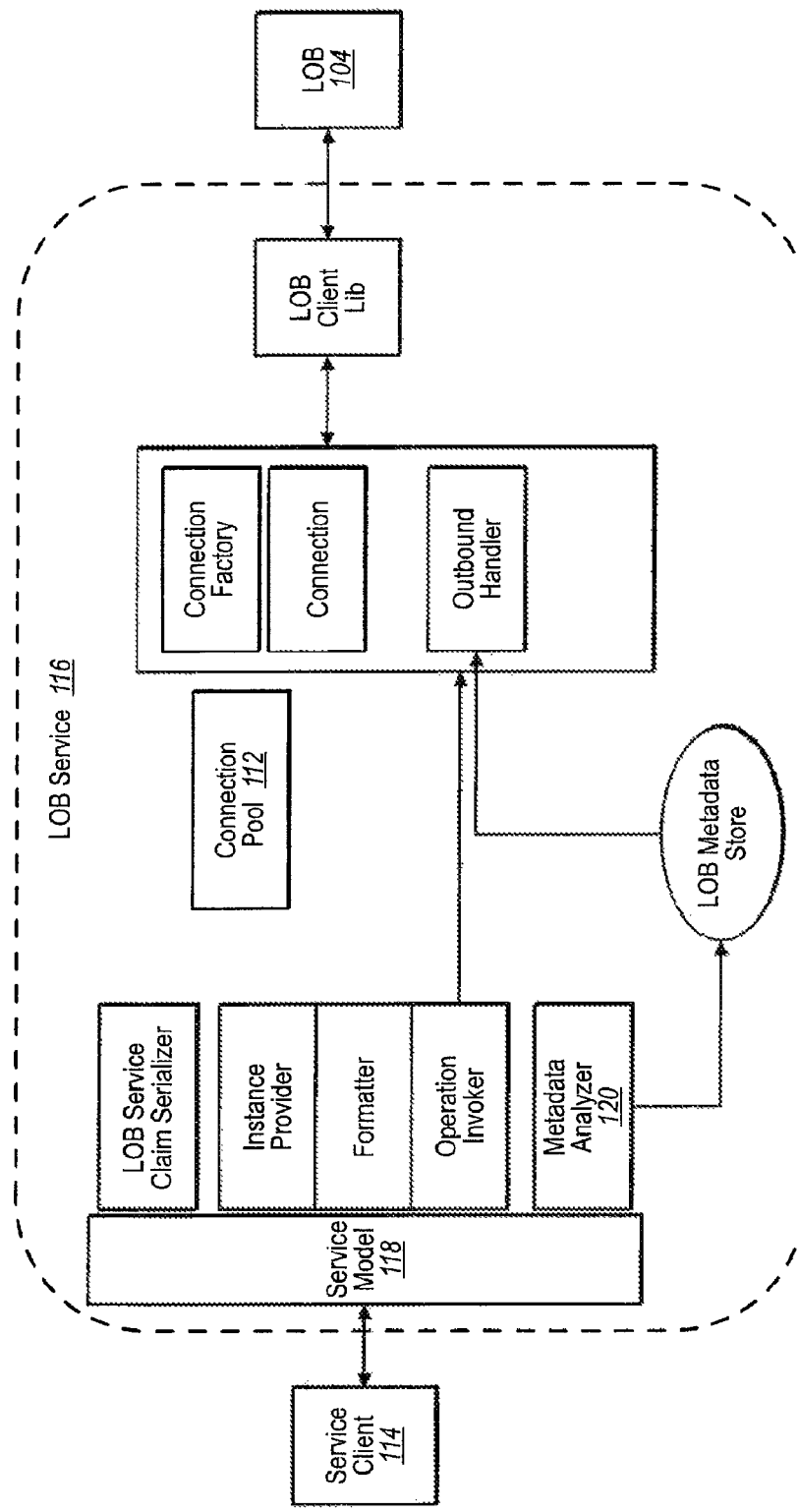
FIG. 1B illustrates an outbound portion of a runtime piece of the framework for translating messages between web services clients and line of business applications.
Figure 1C:
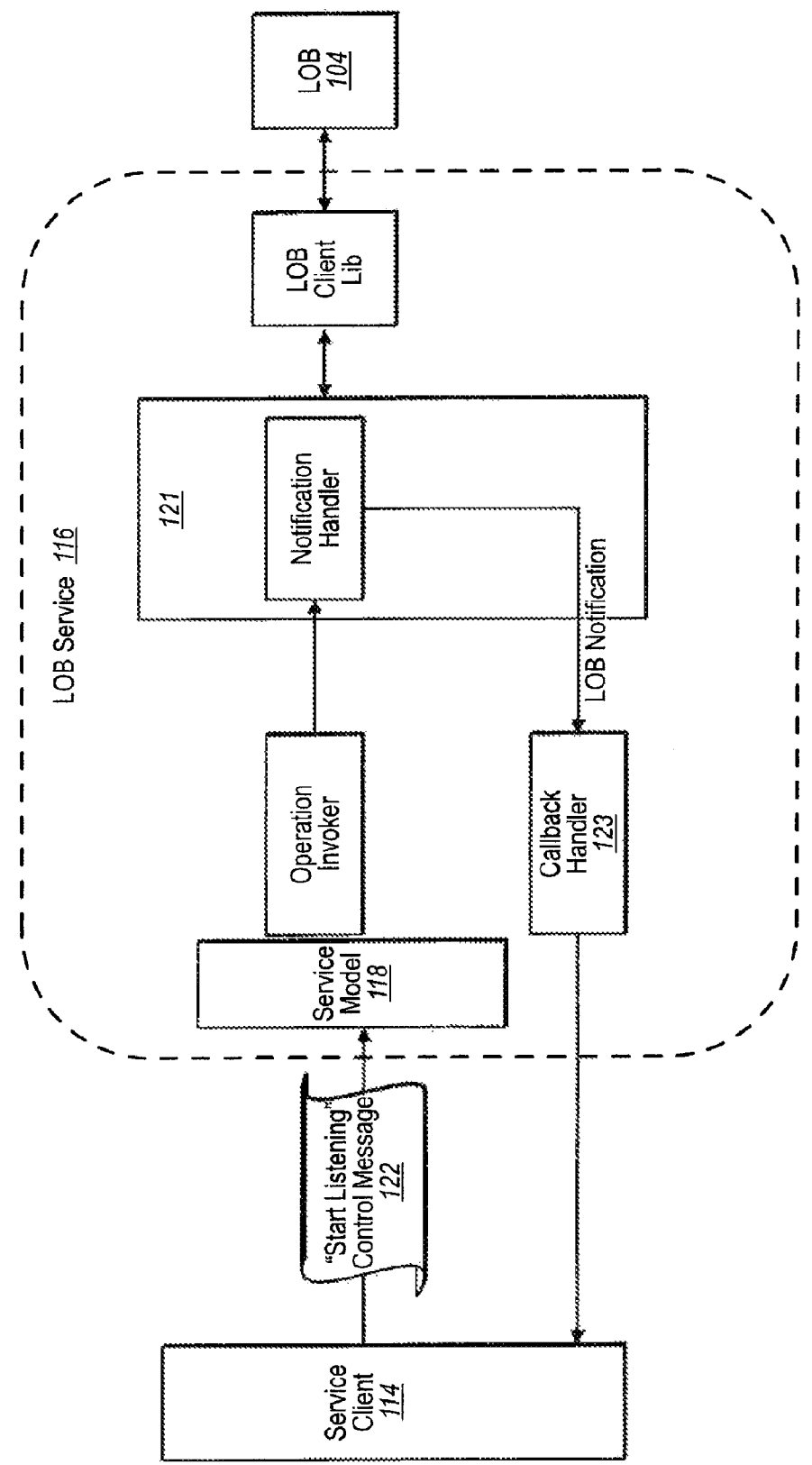
FIG. 1C illustrates an inbound portion of a runtime piece of the framework for translating messages between web services clients and line of business applications.
Figure 2:
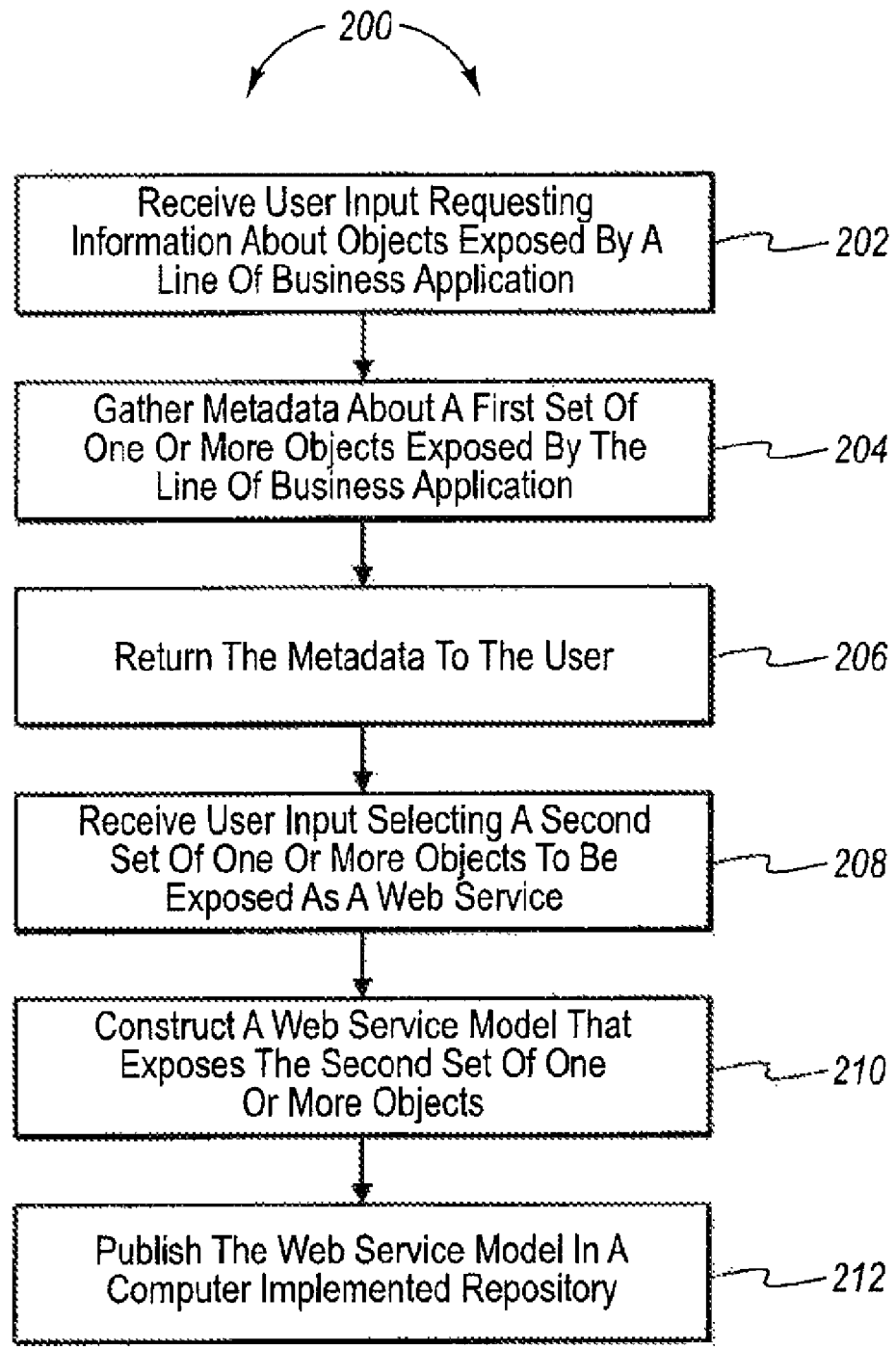
FIG. 2 illustrates a method of creating a web service for exposing a line of business application.

The runtime of the framework is illustrated in FIGS. 1B and 1C. In particular, FIG. 1B illustrates outbound architecture of the runtime (i.e. messages from web service clients to the line of business application), while FIG. 1C illustrates inbound architecture of the runtime (i.e. messages from the line of business application to web service clients). The runtime of the framework first loads the web service and its configuration information and sets up the host environment with all the relevant contract and mapping information.

As illustrated in FIG. 1B, it may also sets up an optional connection pool 112 for use by web service sessions. In particular, often when a line of business application is licensed to an enterprise, it is licensed with limit on the number of connections that can be made to the line of business application at any given time. Thus, line of business connections are costly resources both in terms of connections being created against a target line of business as well as time taken to setup the connection.

As such, in some embodiments, the framework runtime provides an API for getting a connection. A connection may be affinitized with an active instance and may stay with it for the duration of a message, or for a duration longer than the duration of a message. Typical examples where this affinity is useful is when all messages in a session must be using the same line of business connection for reasons like consistency and transactionality of those messages with respect to the line of business. The framework associates a newly created connection with a service instance with which the connection can stay associated, if affinity so demands. The service instance may be used by multiple messages correlated by instance context which may be session or other application level correlation context.

Some embodiments provide extensive and flexible connection management for managing connections of different types and capabilities as required by outbound and inbound processing for a line of business system.

Line of business connections may be used for actual communication/interaction with the line of business application 104. Connections are used in many contexts like during metadata browse/search/retrieval or invocation of actual line of business operations. Typically, line of business connections can support sessions. Also, line of business connections may be transaction aware. Transactions could be both of distributed type as well as local transaction whose scope is limited to a single line of business application. Line of business connections may be highly be contextual. That is, a line of business application could have different types of connections for doing different things like metadata handling, inbound request, outbound request, sessions, transactions etc. Additionally before these connections can be used, line of business applications, in most cases, must authenticate the user for proper credentials.

To address the preceding characteristics regarding connections, embodiments may include various characteristics. In particular, in some embodiments, framework connections are sharable across various client sessions of same credentials. Additionally a connection object's lifetime may be more than the client session in which it was created.

In some embodiments, the framework allows the adapter to provide a credential comparer to allow the framework to pool connections whose credentials cannot be interpreted by the framework. In some embodiments, by default, the framework pools only connections whose credentials are either a system credential or a username/password pair.

Some embodiments of the framework support and manage context sensitive connections. For example an adapter developer could choose to use connection type A for doing distributed transaction operations, connection type B for doing local transactions and connection type C for doing metadata related work. An adapter developer can map the actual line of business connection capabilities onto these web service connection types.

Some embodiments of the framework also give flexibility to adapter developers to ask for a connection which has nothing to do with the context call it is executing in. For example, while doing client request processing, the adapter may need to figure out extra information from a target line of business application. An adapter could have set some context onto the connection associated with a current call, that it cannot be used.

With respect to adapter development various contexts exist in which connections are used. As noted previously, connections can be used for doing metadata related operation on a target line of business application, executing outbound operations against a target line of business application, a target line of business making an inbound call into an adapter, etc. As noted, connection handling will also depend on session and transaction requirements. Additionally, another dimension of connection management is the way these line of business connections handle concurrent requests coming from multiple threads.

To allow various valid permutations and combinations, some embodiments of the framework allow an adapter to define different types to handle each requirement. For example, a metadata handling type may be used to handle metadata operations that do not have any transaction or session requirements. An outbound operation invocation on line of business type may include information on: how to handle operations executing as part of single session, how to handle operations which are part of distributed transactions started and/or participated in by a client, and/or how to handle operations which are invoked in a local transaction context. An Inbound operations type for a line of business calling into an adapter may provide for a line of business application that might want session full behaviour while invoking adapter and/or a line of business that could have invoked the adapter as part of some distributed transaction context.

Connection types for above scenarios can be associated with a session lifetime. For example, if the adapter requested a connection during outbound request, this connection on being released to framework would be kept in an active list. The next time the adapter asks for a connection for client request coming as part of same session, the adapter would be given this connection. When the session is terminated, this connection is returned to the connection pool and becomes available for some other client session.

In some embodiments, the framework has two levels of connection caching including caching for active connections and caching for the connection pool. As such, in some embodiments, a connection could be present in the connection pool, in an active connection list, with either distributed transaction affinity, local transaction affinity or session affinity, or it could be actively used by the adapter.

Connections in the connection pool are clean connections. That is they do not have any association with a session or a transaction. Requests coming for a connection with matching credentials and type are served with a connection from the connection pool.

As noted, appropriate authorization may be required to use a line of business application connection. Thus, some embodiments include functionality for providing appropriate credentials. One aspect of one embodiment is to support claims based authorization. Authorization can be done in a number of different ways. For example, in one embodiment, the line of business application may authorize access. This is the mechanism in which the security credentials and claims generated thereof are used to authorize the requests directly by the line of business systems. This mechanism covers different mechanism of generating claims for line of business authorization including but not limited to passing line of business credentials from client or mapping client credentials to line of business credentials by mechanisms like federated identity, enterprise single-sign-on etc.

In another embodiment, authorization may be accomplished by using service level authorization. Authorization is done by web service authorization mechanism on the security credentials. One typical mechanism for configuring service authorization is with the help of an authorization manager service.

Returning once again to FIG. 1B, outbound interaction with a line of business application is illustrated. This type of interaction happens when an end-user is interested in invoking some operation in a line of business application. Outbound direction is with respect to the adapter/user who is initiating the request to the line of business application 104. Outbound operation could be one-way or two-way. In the case of one-way operation, the invoked operation does not return anything while in case of two-way operation, the invoked operation returns a response message.

The outbound interface is responsible for processing a message directed from a client to the web service. Some embodiments provide an API for implementation of outbound message transformations to line of business invocations as well as access to a metadata map for performing this transformation by the adapter.

For example, FIG. 1B illustrates a service client 114. The service client 114 may send a message to a line of business web service 116. The line of business web service 116 includes a service model 118 that can be used to transform message transformations to line of business invocations. The line of business web service 116 also include a metadata analyzer 120 that can be used analyze metadata from the service client 114 as mapped to metadata for the line of business application 104 so as to appropriately perform the transform of the message from the service client 114.

Also, as noted, the line of business web service may include a connection pool 112 to facilitate using licensed connections for the line of business application 104.

Referring now to FIG. 1C, aspects of the line of business web service 116 directed to inbound interaction with the line of business application 104 are illustrated. The inbound direction is with respect to the adapter, but could be considered outbound with respect to line of business application 104. Typically, the line of business application 104 is the entity that initiates the communication with adapter 116. The adapter, on arrival of such messages, redirects them to an end-user. The inbound interface of the line of business web service 116 is responsible for surfacing notification messages generated from line of business application 104. In case of inbound communication, a listener 121 may be triggered by a control message 122 from a web service client 114. Once the listener 121 is started, notification messages may be received from the line of business application 104 and delivered to a receiver. The receiver may or may not be the same client 114 that triggered the listener. Some embodiments provide an API for implementation of a listener 121 by the adapter 116 as well as mechanism for triggering the listener 121 and delivering notification to an appropriate receiving channel.

Some embodiments provide access to a metadata map so that the adapter 116 can transform line of business specific messages to web services message to be received by a web services channel. In case of outbound operations, it is the user who is making request to line of business application while in case of inbound operations, line of business application asynchronously invokes the user. Users typically register with line of business application for events. These line of business application events could be periodic events (e.g. triggered by a timer) or result of some outbound operation. Once the events get triggered, the listener 121 registered by a user gets trigger.

From an adapter development perspective, the adapter 116 acts as bridge between a line of business application and an end-user. The adapter 116 registers for line of business application events with the line of business application 104 and starts listening for line of business application events. On invocation from the line of business application 104, the adapter invokes the user's callback handler 123 with event data.

For inbound operations, the adapter client application becomes the service listening on an inbound contract while a line of business application service, becomes the client of the inbound contract. Once line of business application event/notification data is available, it is sent over to the client application. If the inbound operation is two way operation, then a response from client is handed over to line of business application.

Attention is directed once again to the concept of connections. As noted, while writing adapters to Line-Of-Business systems, one design issue a developer may need to address is how to manage connections to an underlying line of business system in a consistent manner. In some instances, these connections can be, sessionful, participate in distributed transaction operation, and/or handle local transaction operations. Additionally attention may need to be given to concurrency behavior. That is, attention may be given to determining if multiple threads can simultaneously invoke operations on the same connection instance and handling such instances.

Some embodiments include functionality for allowing adapter developers to use line of business connections in consistent manner to handle sessionful communication, participation in distributed transactions, managing local transactions, handling concurrency and providing throttling control.

Connections allow an external entity to access internal data or execute some code inside line of business systems. As noted, typically, before anyone can open connection to a line of business system, they need to be authenticated. Once authentication is done, users can get a connection, which can be used to do required work on the line of business system.

Line of business connections have various types of capabilities based on their usage scenario as well as underlying a given line of business system's capability. For example, some line of business applications allow users to be able use a connection for chatty conversation. That is, each call has some context which was set by prior call to line of business. These kind of connections are sessionful connections. In some instances, each call on the same connection does not have any relation to a previous call. These kind of connections are non-sessionful. Some line of business applications allow a set of operations executed on a connection to be treated as an atomic block. That is, either all of them succeed or all fail. Thus, these line of business applications support local transactions. Sometimes, a user might open connections with multiple line of business systems (which could be of the same type or different types) and want to execute a block of operations against each of them and expect the block of operations to finish atomically. This defines distributed transaction behavior.

Along with above capabilities line of business applications often have some limitations. For example, on a single line of business connection, users may not be able to invoke simultaneous multiple operations in parallel threads. While for some other line of business this will be supported. This is often referred to as concurrency behavior. Some line of business applications have a hard limit on the number of simultaneous connections. In this context, connections are costly resources in terms of time taken to establish a connection, computing resources needed as well monetary costs for licensing and other factors.

Some embodiments of the framework expose adapters as a web service. Web service clients can connect to the web service and send requests for getting something done. It is the adapter's responsibility to convert the client's request into a line of business request and send it over to a target line of business applications. For returned messages from the line of business application, the adapter picks up the response and converts it to a web service response format and gives it back to to caller or another web service client. Some embodiments of the framework streamline the process of communication between a web service application and a line of business application by providing easy to use APIs for adapter development.

Some embodiments of the framework allow line of business connections to be used in session mode as well as sessionless mode. Further, in some embodiments, a line of business connection created under one client's session is available to another client session provided both clients share the authentication information. This is an example of connection pooling.

Additionally some embodiments are able to map web service based transactions seamlessly to line of business connections if the line of business connections supports transactions. This can be accomplished by using easy to use callbacks.

If some line of business application uses credentials which are not supported by the framework, for example custom tokens specified via SAML, then embodiments may include functionality for implementing an adapter that has flexibility to extend the connection pool in a way that the adapter can determine if two credentials are equal or not. This way such connections can also be pooled.

For client requests coming to same client session, if the underlying line of business connection is concurrent, then some embodiments of the framework let the adapter execute simultaneous calls on same connection. In cases where the underlying line of business connection does not support a concurrent connection, embodiments may include functionality for serializing access to the connection.

For a concurrent distributed transaction request coming in the same client session, some embodiments of the framework allows an adapter to let each request execute on different instances of a line of business connection. This allows true parallelism if line of business application supports it.

The choice of type of connection can be controlled by the adapter depending on the intent. For example, an adapter may obtain a connection based on the connection being used in a local transaction, a distributed transaction, a non-transacted session, or any other parameter that makes sense for the particular line of business system.

In some embodiments, the use of a connection pool enforces a configurable limit on number of open connections and effectively allows reuse of connections. This allows for improved performance as well as efficient utilization of available connections.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

One embodiment include a method 200 including acts for exposing functionality from a line of business application as a web service. The method 200 includes receiving user input requesting information about objects exposed by a line of business application (act 202). For example, a user may access the line of business service design tool 100 and request information about objects at the line of business application 104.

The method 200 further includes gathering metadata about a first set of one or more objects exposed the line of business application (act 204) according to the user input requesting information. For example, as illustrated in FIG. 1C, metadata browse and search functionality may be implemented by a metadata browse and search module 102 for gathering information from the line of business application 104. The method 200 further includes returning the metadata to the user (act 206). User input is received selecting a second set of one or more objects from among the first set of one or more objects to be exposed as a web service (act 208). A web service model may be constructed that exposes the second set of one or more objects (act 210). The web service model includes a service description, a metadata map, and configuration information. As illustrated in FIG. 1A, the service description builder module 106 may include functionality for building a web service model.

Gathering the metadata about the first set of one or more objects can involve multiple calls to the adapter, which might, or might not, propagate to the line of business application. In one embodiment this a first set of operations is exposed as a tree. At the first step, only the top most nodes are displayed. The user might then selectively expand some nodes. The nodes under those are then requested from the adapter, which may need to contact the LOB to obtain them. This tree browsing can be arbitrarily deep with different depths in different branches The method 200 further includes publishing the web service model in a computer implemented repository (act 212). This allows for web service clients to access the second set of objects by accessing the web service model.

The method 200 may be practiced where receiving user input requesting information about objects of a line of business application includes receiving a query. Gathering metadata about a first set of one or more objects of the line of business application according to the user input requesting information in this embodiment includes filtering metadata based on the query.

In an alternative embodiment, receiving user input requesting information about objects of a line of business application includes receiving a browse request for a given category of objects exposed by the line of business. Gathering metadata about a first set of one or more objects of the line of business application according to the user input requesting information in this embodiment includes providing metadata for all objects in the given category.

In some embodiments of the method 200, constructing a web service model that exposes the second set of one or more objects includes mapping unfriendly line of business object names to user friendly web services object names.

Figure 3:
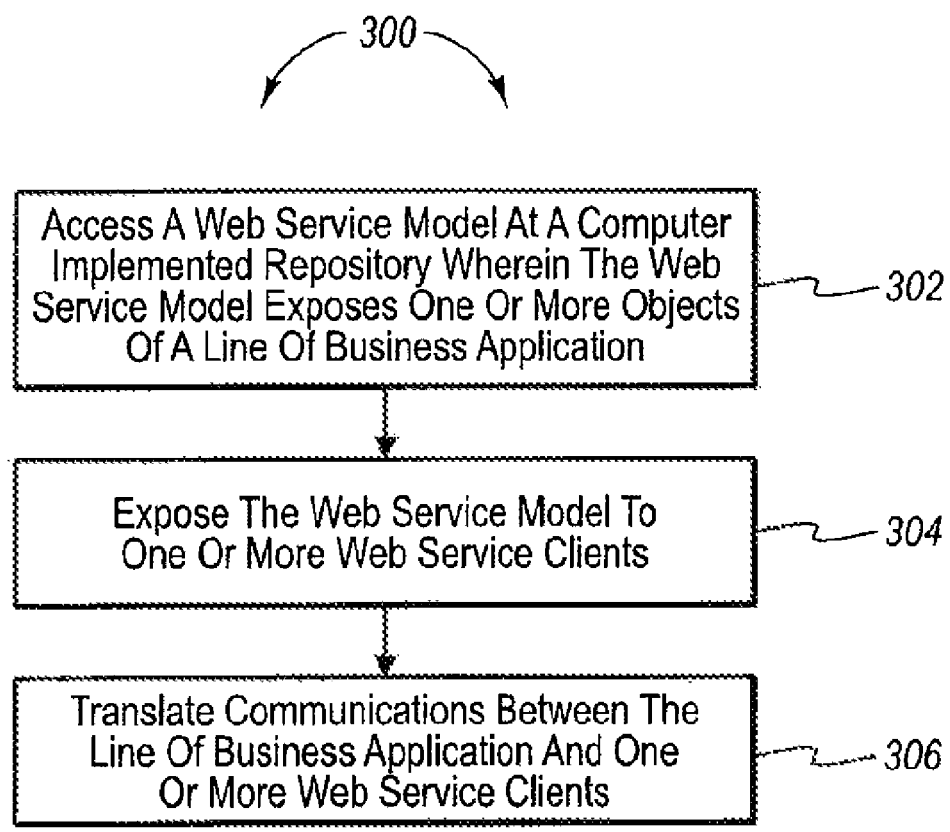
FIG. 3 illustrates a method of translating communications between web service clients and a line of business application.

Referring now to FIG. 3, a method 300 including acts for allowing access to a line of business application through a web service interface is illustrated. The method 300 includes accessing a web service model at a computer implemented repository wherein the web service model exposes one or more objects of a line of business application (act 302). The web service model may include a service description, a metadata map, and configuration information. The method 300 further includes exposing the web service model to one or more web service clients (act 302). The method 300 further includes translating communications between the line of business application and one or more web service clients. As illustrated in FIGS. 1B and 1C, an adapter may be implemented as a web service 116 that can translate messages between a web service client 114 and a line of business application 104.

For example, in one embodiment of the method 300, translating communications between the line of business application and one or more web service clients includes processing a message directed from a client to the web service by transforming web service messages to line-of-business invocations. In some embodiments, to perform this transformation, the method 300 may further include accessing the metadata map for performing the transformation.

As described previously, some embodiments allow for the use of connection pools. Thus, the method 300 may further including setting up a connection pool for use by web service clients so as to efficiently utilize licensed connections for the line of business application. For example, when connections are allocated for a single message, the method 300 may further include receiving a message from a web service client; allocating a licensed connection from the connection pool for the message; sending the message to the line of business application through the connection; and as a result of the message being sent, closing the connection and returning the connection to the connection pool for use for other messages.

When connections from the connection pool need to be allocated for longer than a single message, such as to complete a transaction or session, the method 300 may further include receiving a message from a web service client; determining that a connection for the message should keeping open for a period of time longer than the duration of the message; allocating a licensed connection from the connection pool for the message; sending the message to the line of business application through the connection; and keeping open the connection after the message has been sent. This embodiment may further include keeping open the connection including keeping open the connection until a transaction to which the message belongs is complete, and thereafter, closing the connection and returning the connection to the connection pool for use for other messages. Alternatively, keeping open the connection may include keeping open the connection until a session to which the message belongs is complete, and thereafter, closing the connection and returning the connection to the connection pool for use for other messages. In yet another alternative, keeping open the connection may include keeping open the connection until an application context to which the message belongs is complete, and thereafter, closing the connection and returning the connection to the connection pool for use for other messages.

In inbound embodiment, the method 300 may be performed where translating communications between the line of business application and one or more web service clients includes translating notification messages generated from the line of business application to a web service notification. The method may further including sending the web service notification to a web service. In some embodiments, this may be facilitated by starting a listener module as a result of receiving a control message from a web service client. Once the listener is started, notification messages may be received from the line of business application and delivered to a receiver. The receiver may be the same web service client as the one which sent the control message in a duplex connection or may be a different web service.

Embodiments of the method 300 may also include authentication functionality. For example, the method 300 may include authorizing access from the web service client to the line of business application by mapping web service client credentials to line of business application credentials. In alternative embodiments, the method 300 may include authorizing access from the web service client to the line of business application by passing line of business credentials from the web service client.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of exposing functionality from a line of business application as a web service, the method comprising:
   receiving user input requesting information about objects exposed by a line of business application;
   gathering metadata about a first set of one or more objects exposed by the line of business application according to the user input requesting information;
   returning the metadata to the user;
   receiving user input selecting a second set of one or more objects from among the first set of one or more objects to be exposed as a web service;
   constructing a web service model that exposes the second set of one or more objects, the web service model comprising a service description, a metadata map, and configuration information; and
   publishing the web service model in a computer implemented repository to allow for web service clients to access the second set of objects by accessing the web service model,
      wherein the web service clients access the second set of objects through the web service model by way of a connection pool that is provided as part of the web service and that manages licensed connections for the line of business application,
      wherein a message from one of the web service clients using a particular web service object of the second set of the one or more objects results in a licensed connection being allocated from the connection pool for sending the message to the line of business application, and
      wherein the licensed connection is kept open after the message has been sent, in response to a determination that the licensed connection should stay open for a period of time longer than the duration of the message.

2. The method of claim 1, wherein receiving user input requesting information about objects of a line of business application comprises receiving a query and wherein gathering metadata about a first set of one or more objects of the line of business application according to the user input requesting information comprises filtering metadata based on the query.

3. The method of claim 1, wherein receiving user input requesting information about objects of a line of business application comprises receiving a browse request for a given category of objects exposed by the line of business and wherein gathering metadata about a first set of one or more objects of the line of business application according to the user input requesting information comprises providing metadata for all objects in the given category.

4. The method of claim 1, wherein constructing a web service model that exposes the second set of one or more objects comprises mapping unfriendly line of business object names to user friendly web services object names.

5. A computer storage device storing computer-executable instructions, which, when executed by at least one processor, implement a method of exposing functionality from a line of business application as a web service, wherein the method includes:
   receiving user input requesting information about objects exposed by a line of business application;
   gathering metadata about a first set of one or more objects exposed by the line of business application according to the user input requesting information;
   returning the metadata to the user;
   receiving user input selecting a second set of one or more objects from among the first set of one or more objects to be exposed as a web service;
   constructing a web service model that exposes the second set of one or more objects, the web service model comprising a service description, a metadata map, and configuration information; and
   publishing the web service model in a computer implemented repository to allow for web service clients to access the second set of objects by accessing the web service model,
      wherein the web service clients access the second set of objects through the web service model by way of a connection pool that is provided as part of the web service and that manages licensed connections for the line of business application,
      wherein a message from one of the web service clients using a particular web service object of the second set of the one or more objects results in a licensed connection being allocated from the connection pool for sending the message to the line of business application, and
      wherein the licensed connection is kept open after the message has been sent, in response to a determination that the licensed connection should stay open for a period of time longer than the duration of the message.

6. The computer storage device of claim 5, wherein receiving user input requesting information about objects of a line of business application comprises receiving a query and wherein gathering metadata about a first set of one or more objects of the line of business application according to the user input requesting information comprises filtering metadata based on the query.

7. The computer storage device of claim 5, wherein receiving user input requesting information about objects of a line of business application comprises receiving a browse request for a given category of objects exposed by the line of business and wherein gathering metadata about a first set of one or more objects of the line of business application according to the user input requesting information comprises providing metadata for all objects in the given category.

8. The computer storage device of claim 5, wherein constructing a web service model that exposes the second set of one or more objects comprises mapping unfriendly line of business object names to user friendly web services object names.

9. The computer storage device of claim 5, wherein the computer storage device comprising a computing system that includes the at least one processor.

10. A computing system comprising:
at least one processor; and
at least one storage device having stored thereon computer executable instructions that, when executed by the at least one processor, implement a method for wrapping a web service interface around a line of business application to expose functionality of the line of business application to web service clients, wherein the method includes:
exposing a web service model to a web service client via a web service interface, the web service model including one or more web service model objects that each expose one or more objects of a line of business application to the web service client;
instantiating a connection pool for communication between the line of business application and the web service client, the connection pool for use by the web service client so as to efficiently utilize licensed connections for the line of business application, the licensed connections selected from among a plurality of types of connections based on the kinds of messages to be carried on the licensed connections;
receiving a message from the web service client over the web service interface;
allocating a particular licensed connection from the connection pool for sending the message to the line of business application;
sending the message to the line of business application through the particular licensed connection, including translating communications between the line of business application and the web service client by at least:
converting the message to an equivalent line of business message, including mapping first parameter data received as part of the message to a corresponding parameter for a line of business application object;
converting at least one line of business notification to an equivalent web service notification; and
transferring the equivalent line of business message and the equivalent web service notification between the line of business application and the web service client using the particular licensed connection;
determining that the particular licensed connection should stay open for a period of time longer than the duration of the message; and
keeping open the particular licensed connection after the message has been sent.

11. The computing system of claim 10, wherein keeping open the particular licensed connection comprises keeping open the particular licensed connection until a transaction to which the message belongs is complete, and thereafter, closing the particular licensed connection and returning the particular licensed connection to the connection pool for use for other messages.

12. The computing system of claim 10, wherein keeping open the particular licensed connection comprises keeping open the particular licensed connection until a session to which the message belongs is complete, and thereafter, closing the particular licensed connection and returning the particular licensed connection to the connection pool for use for other messages.

13. The computing system of claim 10, wherein keeping open the particular licensed connection comprises keeping open the particular licensed connection until an application context to which the message belongs is complete, and thereafter, closing the particular licensed connection and returning the particular licensed connection to the connection pool for use for other messages.

14. The computing system of claim 10, further comprising starting a listener module as a result of receiving a control message from the web service client, and wherein once the listener is started notification messages may be received from the line of business application and delivered to a receiver.

15. The computing system of claim 14, wherein the receiver is a web service that is uncorrelated to the web service client from which the control message was received.

16. The computing system of claim 10, further comprising authorizing access from the web service client to the line of business application by mapping web service client credentials to line of business application credentials.

17. The computing system of claim 10, further comprising authorizing access from the web service client to the line of business application by passing line of business credentials from the web service client.

18. The computing system of claim 10, wherein the web service model includes:
a service description,
a metadata map that maps line of business object metadata to web service object metadata, including at least one metadata mapping that maps an input parameter of a particular web service model object to a corresponding input parameter of a particular line of business application object, and
configuration information for configuring the web service interface using the web service model.

* * * * *